United States Patent [19]

Millon

[11] 3,984,758
[45] Oct. 5, 1976

[54] METHOD AND APPARATUS FOR GEOPHYSICAL EXPLORATION IN DRILL HOLES BY MEANS OF VERY LOW FREQUENCY WAVES

[75] Inventor: Raymond F. Millon, Orleans Cedex, France

[73] Assignee: Bureau de Recherches Geologiques et Minieres, Orleans Cedex, France

[22] Filed: Feb. 26, 1975

[21] Appl. No.: 553,410

[30] Foreign Application Priority Data
June 14, 1974 France .............. 74.20656

[52] U.S. Cl. .................................. 324/6; 324/7
[51] Int. Cl.² ...................... G01V 3/12; G01V 3/18
[58] Field of Search .................. 324/3, 6, 7, 8

[56] References Cited
UNITED STATES PATENTS

| | | | |
|---|---|---|---|
| 2,268,106 | 12/1941 | Blau | 324/6 |
| 2,291,692 | 8/1942 | Cloud | 324/8 |
| 2,642,477 | 6/1953 | Puranen et al. | 324/6 |
| 2,746,009 | 5/1956 | McLaughlin et al. | 324/6 |
| 2,955,250 | 10/1960 | Shaw et al. | 324/6 X |
| 2,992,325 | 7/1961 | Lehan | 324/6 X |
| 2,996,657 | 8/1961 | Varian | 324/8 X |
| 3,321,700 | 5/1967 | Zimmerman | 324/8 |
| 3,391,334 | 7/1968 | Ruehle | 324/8 |
| 3,398,356 | 8/1968 | Still | 324/6 |
| 3,690,164 | 9/1972 | Gabillard | 324/6 X |
| 3,763,419 | 10/1973 | Barringer | 324/6 |

*Primary Examiner*—Gerard R. Strecker
*Attorney, Agent, or Firm*—Sughrue, Rothwell, Mion, Zinn and Macpeak

[57] ABSTRACT

A method and apparatus for geophysical exploration which does not require the installation of a low frequency transmission source in the proximity of the drill hole.

A surface pick-up 3 detects the magnetic field component of a low frequency signal, which, after amplification and filtering, is supplied as one input of a comparator 9. A pick-up 7 disposed in a drill hole detects the corresponding magnetic field components within the earth, and its output is supplied as the other comparator input. The amplitude ratios of the signals and their phase difference are provided at the outputs of the comparator. These values make it possible to determine the resistivity variations of the ground.

The extent of the detected conductivity layer(s) may be determined by repeating the operation using a second low frequency transmitter positioned at a different azimuth angle from the first, and comparing the output readings.

9 Claims, 2 Drawing Figures

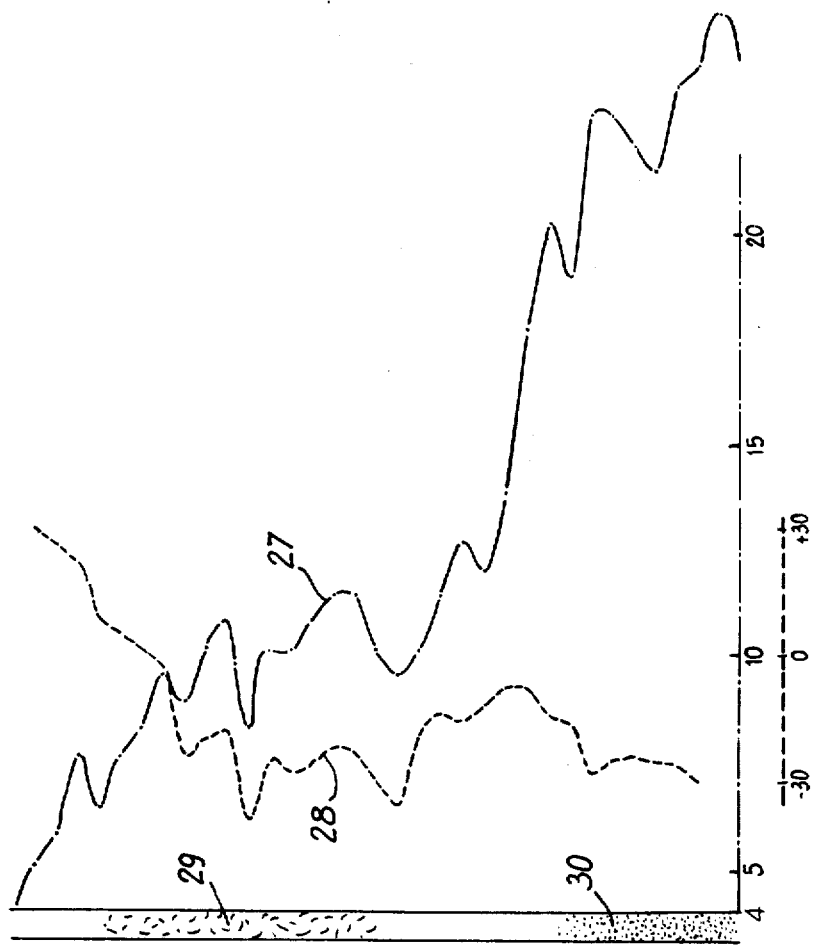
Fig. 2
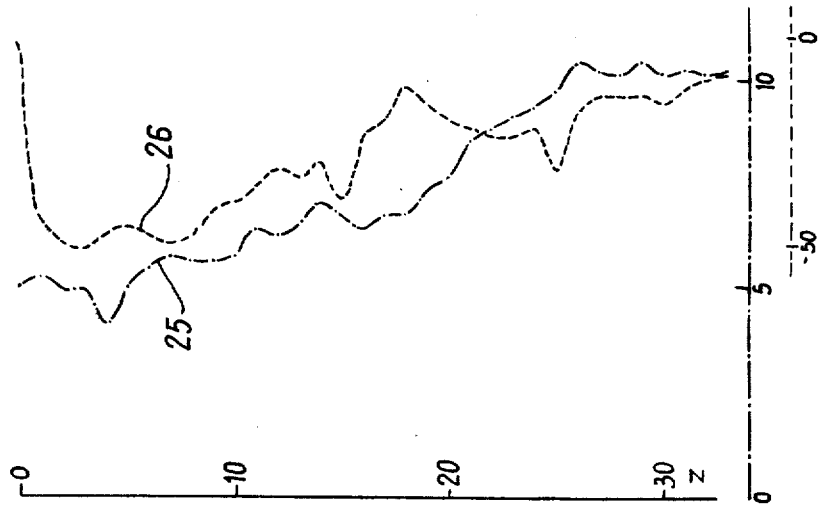

METHOD AND APPARATUS FOR GEOPHYSICAL EXPLORATION IN DRILL HOLES BY MEANS OF VERY LOW FREQUENCY WAVES

BACKGROUND OF THE INVENTION

1. Field of the Invention

This invention concerns a method and apparatus for the geophysical exploration of the conductor layers passing through a drill hole, or adjacent to a drill hole, by means of very low frequency waves and, more particularly, to a method using the variations of an alternating magnetic field component along the drill hole.

2. Description of the Prior Art

There are known methods of geophysical investigations employing very low frequency waves transmitted by an emitter generally near the place where the measurements of the picked-up field parameters are effected. These parameters include the amplitude, the phase or the components in phase and in quadrature with the components of the alternating magnetic or electric field used to detect the conductor zones.

All these methods require special transmitters whose frequencies are varied, or receivers which can be readily transported.

Another known technique uses the waves transmitted by a distant L.F.T. station, since these waves are propagated over long distances and penetrate the ground to a great depth. This implements airborne prospecting by comparing the variations of an L.F.T. electro-magnetic field parameter along low altitude flight paths.

Similarly, it is known to draw up horizontal profiles of the apparent resistivities of the ground by using light-weight, easily handled L.F.T. receivers which are moved over the ground.

However, since these processes do not make it possible to accurately determine the depth of the conductor layers, it has been necessary to have available an L.F.T. transmitter adjacent to the prospected place and to associate therewith a detector of a given parameter which is lowered into a drill hole in order to locate these layers with greater exactness.

To sum up, either one could use known L.F.T. stations on the surface, but just detecting an apparent resistivity giving only brief indications of the conductor zones, or one could accurately determine the depth of these conductor layers using special detectors close to a drill hole, the latter serving as a passage for the measuring apparatus.

SUMMARY OF THE INVENTION

The principle object of the present invention is to provide a method and apparatus for geophysical exploration in drill holes by utilizing the propagation of a very low frequency wave, characterized in that the L.F.T. wave employed is from a distant L.F.T. source, thus causing the wave surfaces to be practically parallel, and in that the parameters measured at a depth Z in a drill hole are the projections of the alternating horizontal field component on the axis of the drill hole and the phase of this field relative to the surface field.

The immediate advantage of such a method is economy in the means of putting the process into practice, since it is no longer necessary to provide and displace a special L.F.T. transmitter. Another advantage is that the magnetic field component at a predetermined depth and the magnetic field component on the surface can be very easily compared by using a magnetic field pick-up which is introduced into the drill hole, and an identical pick-up on the surface, the signals received by the pick-ups being transmitted to a comparator capable of supplying the phase difference and the amplitude ratio of the detected field components.

With the knowledge of the functional and depth variations of the electro-magnetic field of a surface wave penetrating a supposedly homogeneous soil, it is possible to determine the conductivity variations of the traversed layers.

Another object of the invention is the exploration of the extent of conductor layers detected by means of the above method, the pick-ups being tuned to receive a very low frequency wave originating from a source at a different azimuth angle from the first.

A comparison of the values of the parameters determined from the first and second transmitters enables a determination of the direction of each conductor zone relative to the directions of the transmitters concerned. It is also possible to detect the presence of conductor layers and bodies near the drill hole but not traversed thereby.

An apparatus for carrying out the above method of investigation comprises at least two means of receiving a wave of very low frequency and an apparatus for comparing the signals received in phase and in amplitude, the apparatus including two magnetic field pick-ups tuned to the same predetermined frequency, one of the pick-ups being fixed to the surface of the ground in the vicinity of a drill hole, and the other being displaceable along the axis of the drill hole, the axis of the coil of this pick-up remaining parallel with the axis of the drill hole.

It is only necessary to tune these pick-ups to another frequency, or to replace them with pick-ups tuned to receive a second frequency corresponding to a transmitter oriented at a different azimuth angle from that of the wave transmitter on the first frequency in order to effect, with the same apparatus, another series of measurements to indicate the extent of the conductor layers in different orientations. Moreover, since the axis of the magnetic field pick-up coil is parallel to the axis of the drill hole, it is apparent that it is possible to obtain great sensitivity of detection by using a drill hole with a vertical axis, or appreciable amplitude values of the field, by inclining the axis of the drill hole, th coil transmitting an alternating signal proportional to the projection of the horizontal field on the axis of the coil inclined to the vertical. Experience shows that a greater lateral investigation is possible in this manner.

BRIEF DESCRIPTION OF THE DRAWINGS

In the drawings:

FIG. 2 shows a graph of the variations, according to depth, of the phase differences and amplitude ratios of the magnetic field components for two distinct orientations of the very low frequency transmission sources.

DESCRIPTION OF THE PREFERRED EMBODIMENT

Figure 1:
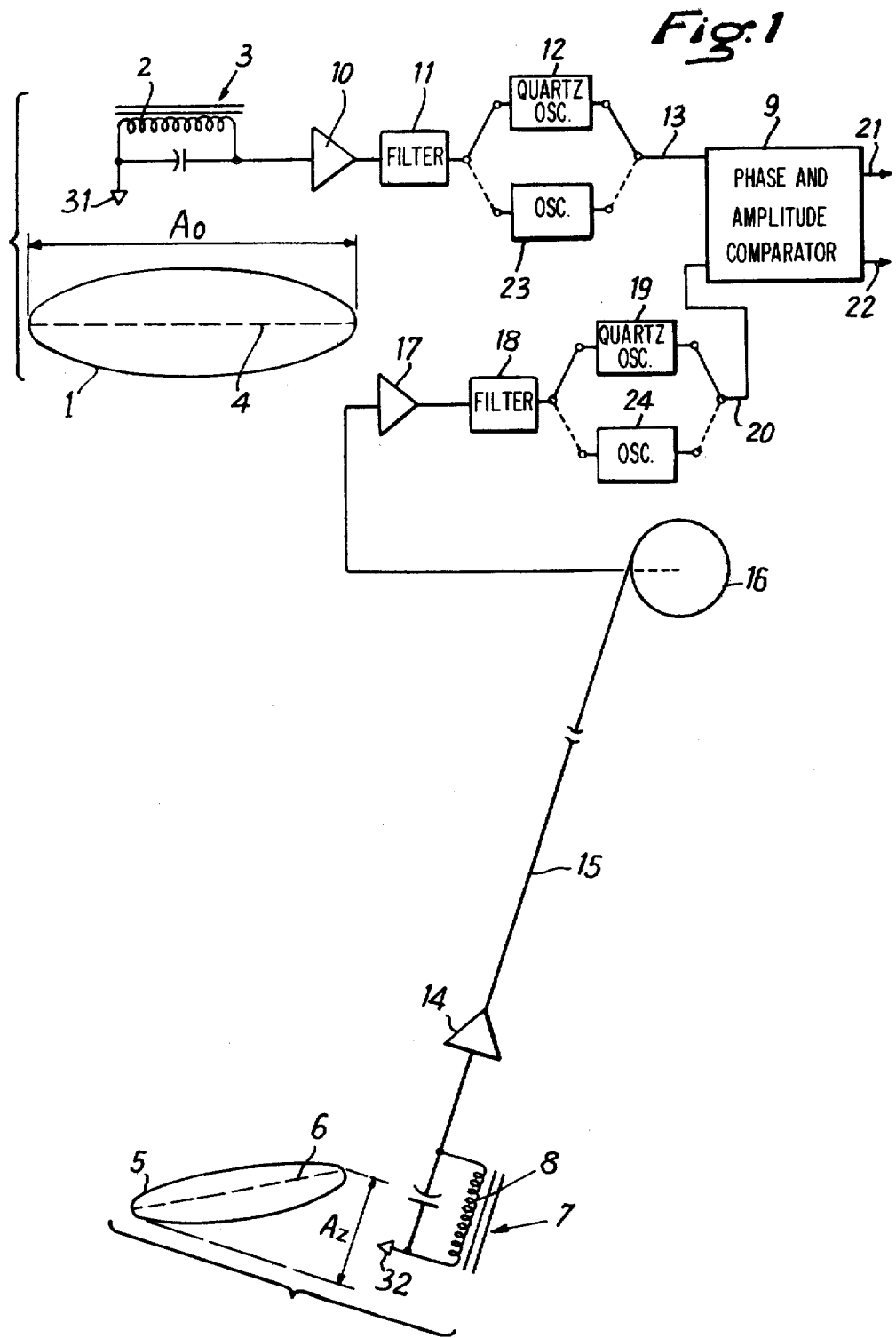
FIG. 1 is a schematic view, in the form of block circuits, of the apparatus for carrying out the method.

In FIG. 1, the reference numeral 1 shows, opposite the coil 2 of the pick-up, the polarization ellipse of the magnetic field components, on the surface, of the electro-magnetic wave transmitted by a distant L.F.T. transmitter. To receive a maximum field the axis of the coil 1 is shown parallel to the main axis 4 of the polarization ellipse, the value Ao of the main axis being proportional to the field amplitude.

When the surface wave, of frequency $f$, penetrates ground formed by a homogeneous medium having a resistivity $\rho$, this value decreases and the amplitude Az at the depth z, becomes $$Az = Ao\, e^{-z/p}$$

whilst the field phase becomes $\phi z = \phi o - z/p$, $\phi o$ being the phase of the field vector on the surface and p the depth of the ground in meters corresponding to an attenuation of the wave of 2.7, or 8.7 db, wherein $$p = 500\ \sqrt{\rho/f},$$

p being expressed in meters, the resistivity $\rho$ in ohm meters and the frequency f in hertz. Any variation of resistivity with depth results in an alteration of these values and the polarization ellipse takes a new direction, as shown by the polarization ellipse 5 at the depth z, the main axis 6 of which is displaced in direction relatively to the axis 4, the field being out of phase at this level relative to the surface field. The maximum field received by the pick-up 7 corresponds to the projection Az of the ellipse 5 on the axis of the coil 8 of the pick-up 7, this axis being parallel with the axis of the drill hole, inclined or not. The pick-ups 3 and 7 are either tuned to receive the very low frequency of the selected transmitting stations, or preferably designed especially to receive this frequency.

The signals received by the pick-ups 3 and 7 are transmitted, after amplification and filtering, to a phase and amplitude comparator 9. For this purpose, the coil 3 is connected to a conventional amplifier 10, the output of which is connected to a filter 11 comprising a quartz oscillator 12. The output of the filter is connected to the input 13 of the comparator 9.

The transmission of the signal of the sounding pick-up 7 is effected by a similar circuit, but also comprises a pre-amplifier 14 for the transmission, by co-axial cable 15, wound round the winch 16, of the signal transmitted by the coil 8. This signal is amplified by amplifier 17, then transmitted to the comparator 9 through a filter 18 comprising a quartz oscillator 19, tuned to the frequency of the distant transmitter. The signal transmitted to the input 20 of the comparator is therefore compared with the reference signal at the input 13 of the comparator for each level of the pick-up 7. The comparator 9 comprises two outputs 21 and 22 respectively supplying the field amplitude ratios Az/Ao and the phase difference $\phi z - \phi o$, or values in proportion thereto.

The outputs 21 and 22 may be coupled to any conventional recording means, or be supplied to simple reading devices.

If the transmission is impaired by telegraphic signals, the reading device may be shunted by a suitable circuit or a simple capacitor retarding the oscillation of the indicator needle for reading or recording the mean value of the measurement.

Since experiments have shown that it is possible to obtain a satisfactory indication of the extension of the conductor zones in the direction of the selected L.F.T. transmitter, it is possible to use, in addition to the quartz oscillators 12 and 19 tuned to the frequency of the first transmitter, two other oscillators 23 and 24 tuned to the frequency of a second L.F.T. transmitter situated in a direction different from that of the first transmitter. After the pick-ups 3 and 7 have been tuned to this frequency, or after these pick-ups have preferably been replaced by pick-ups specially designed for receiving the frequency concerned, the new values of the amplitude ratios and phase differences are noted or recorded. The closest possible frequencies of the selected transmitters will be chosen according to the method used.

By way of example, FIG. 2 shows graphs of the variations of the amplitude ratios 25 and 27 and phase difference variations 26 and 28 for two series of measurements, one at a frequency of 17.8 KHz, the other at 16 KHz, the azimuth difference of the transmitters being approximately 90°. The ordinate OZ of the curves 25 and 26 is graduated in meters, the abscissa of the curve 25 of the amplitude ratio is graduated in percentages, and the abscissa of the curve 26 of the phase difference is graduated in degrees. In order to compare the curves 25, 26 and the curves 27, 28 conveniently, the axes of the abscissa of the latter have been displaced to the right. It may be observed that towards eight meters, an initial increase of conductivity is detected extending to a score of meters. In this region, represented symbolically at 29, black pyritic schists are found. At about 25 meters, a new increase of conductivity is detected corresponding to the region 30 in which pyrite is found at the place where the drill hole has been made. Simple comparison of the curves 25, 26 obtained by using a transmitter oriented to the west with the curves 27, 28 obtained by using a transmitter oriented to the north, shows that the conductor zones detected extend rather in the north and south direction.

The simplicity of the described apparatus makes the application of the method of investigation particularly easy. After even a shallow drill hole is made at the place concerned, the pick-up 3, designed for the selected frequency, is oriented until a signal of maximum amplitude is obtained. The pick-up 7 is then lowered into the drill hole to a level without any metal tubing and, leaving the pick-up 3 fixed in position, the values of the amplitude ratios Az/Ao of the fields at depth and on the surface are noted or recorded, as are the phase difference of the fields for each level desired. Initially, a calibrated measurement is made with the two pick-ups located in parallel on the surface. When an indication is desired of the extent of the conductor zones which have been noted, surface and sounding pick-ups are selected adapted to the frequency of the second L.F.T. transmitter selected, having an azimuth distinct from that of the first transmitter, and the same process is carried out as before. Orientation of the maximum extension of the conductor zones corresponds to the maximum variations of the measured quantities, i.e., amplitude and phase difference ratios. It is also clear that these same measurements may be further extended or completed by using the transmission of a third transmitter having an azimuth angle different from the first two.

As to the described apparatus, it is sufficient to indicate at 31 and 32 the earthing of the detectors 3 and 7 without representing the feeds, these being conventional, as are the filters, amplifiers and comparators. Since the mechanical means ensuring the lowering and raising of the pick-up 7 may be of any kind, it is sufficient to represent the co-axial cable wound round the winch 16. It is obvious that a bearing cable may be added to the coaxial cable. Similarly, although the pick-up 3 may be turned in any direction and has means enabling it to be fixed in position, these convenional means, which are not claimed as such, have not been shown. Finally, the drill hole may be protected by non-metallic tubing which does not prevent the good transmission of the field.

I claim:
1. A method of geophysical exploration in drill holes utilizing the propagation of very low frequency electromagnetic waves emitted by distant low frequency sources, comprising:
   a. selecting a first low frequency transmitter as a fixed source of a very low frequency electromagnetic wave having a first frequency,
   b. positioning on the surface proximate to a drill hole a first receiver and detecting the magnetic field component of said very low frequency electromagnetic wave having said first frequency,
   c. lowering a second receiver to various depths in said drill hole and detecting the magnetic field component of said very low frequency electromagnetic wave having said first frequency at each of said various depths,
   d. measuring the amplitude ratio of the magnetic field component of said very low frequency electromagnetic wave having said first frequency detected at said various depths in said drill hole relative to the amplitude of said magnetic field component detected on the surface,
   e. selecting a second low frequency transmitter as a fixed source of a very low frequency electromagnetic wave having a second frequency, said second low frequency transmitter having an azimuth orientation different from that of said first low frequency transmitter,
   f. repositioning on the surface proximate to said drill hole said first receiver and detecting the magnetic field component of said very low frequency electromagnetic wave having said second frequency,
   g. lowering said second receiver to various depths in said drill hole and detecting the magnetic field component of said very low frequency electromagnetic wave having said second frequency at each of said various depths,
   h. measuring the amplitude ratio of the magnetic field component of said very low frequency electromagnetic wave having said second frequency detected at said various depths in said drill hole relative to the amplitude of said magnetic field component detected on the surface,
   i. comparing the measured amplitude ratios with the theoretical values of these ratios when said very low frequency electromagnetic waves pass through a homogeneous medium of a given resistivity or a succession of horizontally stratified soils, and
   j. comparing the two series of measurement to obtain an indication of the direction of the conductor layers.

2. A method of geophysical exploration as claimed in claim 1, further comprising:
   a. measuring the phase shift of the magnetic field component of said very low frequency electromagnetic waves detected at said various depths in said drill hole relative to the phase of said magnetic fields detected on the surface, and
   b. comparing those measured phase shifts with the theoretical phase shifts of the magnetic fields when said very low frequency electro-magnetic waves pass through a homogeneous medium of a given resistivity of a succession of horizontally stratified soils.

3. A method of geophysical exploration as claimed in claim 1, wherein said first and second receivers each comprise a magnetic field pick-up tuned to the frequency of said selected transmitter and the step of positioning on the surface is effected by orienting the magnetic field pick-up of said first receiver until the maximum signal is obtained and maintaining this orientation throughout the measurements.

4. A method of geophysical exploration as claimed in claim 3, wherein the detection of the magnetic fields at said various depths is effected by orienting the magnetic field pick-up of said second receiver so that the axis of this pick-up remains parallel to the axis of the drill hole.

5. A method of geophysical exploration as claimed in claim 1 in which a substantially vertical drill hole is used for detecting variationns of conductivity, and an inclined drill hole is used for lateral investigations.

6. A method of geophysical exploration as claimed in claim 1 wherein, the azimuth angle of the second transmitter is substantially different from that of the first transmitter and the frequency of the second transmitter is close to the frequency of the first transmitter.

7. An apparatus for geophysical exploration on drill holes utilizing the propagation of very low frequency electromagnetic waves emitted by distant low frequency sources, comprising:
   a. first means adapted to be positioned on the surface proximate to a drill hole for selectively receiving the magnetic field component of one and then another of said very low frequency electromagnetic waves,
   b. second means adapted to be positioned at various depths in said drill hole for selectively receiving the magnetic field component of one and then another of said very low frequency electromagnetic waves at each of said various depths, said first and second receiving means each comprising magnetic field pick-ups including a coil, one of said pick-ups being positioned on the surface and another moveably displaceable along said drill hole, the axis of the coil of the moveable pick-up remaining parallel with the axis of said drill hole,
   c. an amplitude and phase comparator having first and second signal inputs and first and second signal outputs,
   d. a first amplifier and first and second selectable filters connected in series between said first receiving means and said first signal input to said comparator, and
   e. a second amplifier and third and fourth selectable filters connected in series between said second receiving means and said second signal input to said comparator, said first and third filters being tuned to the same frequency corresponding to one of said very low frequency electromagnetic waves and said second and fourth filters being tuned to the same frequency corresponding to another of said very low frequency electromagnetic waves, said comparator providing a first output proportional to the ratio of the amplitudes of the magnetic fields detected and a second output proportional to the phase difference of the fields.

8. An apparatus as claimed in claim 7 wherein the filters are identical and each comprise a quartz oscillator tuned to the frequency of the selected transmitter, a pre-amplifier being connected between the movable pick-up and a co-axial cable connecting it to the comparator by means of said second amplifier and said second filter.

9. An apparatus as claimed in claim 8 wherein the surface pick-up is directionally orientable and pick-ups are interchangeable for pick-ups tuned to another very low frequency.

* * * * *